United States Patent
Bartram et al.

(10) Patent No.: US 7,293,284 B1
(45) Date of Patent: Nov. 6, 2007

(54) CODEWORD-ENHANCED PEER-TO-PEER AUTHENTICATION

(75) Inventors: Linda R. Bartram, Vancouver (CA); Nicholas J. Sawadsky, Vancouver (CA)

(73) Assignee: Colligo Networks, Inc., Vancouver, BC (CA)

( * ) Notice: Subject to any disclaimer, the term of this patent is extended or adjusted under 35 U.S.C. 154(b) by 834 days.

(21) Appl. No.: 10/334,765

(22) Filed: Dec. 31, 2002

(51) Int. Cl.
*H04L 9/00* (2006.01)

(52) U.S. Cl. .................... 726/10; 713/156; 713/168

(58) Field of Classification Search ............... None
See application file for complete search history.

(56) References Cited

U.S. PATENT DOCUMENTS

| | | | |
|---|---|---|---|
| 5,148,479 A | 9/1992 | Bird et al. | |
| 5,371,794 A | 12/1994 | Diffie et al. | |
| 2003/0014637 A1* | 1/2003 | Ellison et al. | 713/178 |
| 2003/0163739 A1* | 8/2003 | Armington et al. | 713/202 |

OTHER PUBLICATIONS

Ka-Ping Yee, "User Interaction Design for Secure Systems", Computer Science Department University of California Berkeley (15 pages).

Walden Harvey, "Peer-To-Peer Network User Authentication Protocol", http://toolkit.dialog.com/intranet/cgi/present?STYLE=621875714&PRESENT=DB=349, Dec. 10, 2002, (pp. 1-16).

Alma Whitten et al, Paper—Proceedings of the 8th USENIX Security Symposium Aug. 23-26, 1999, Washington, D.C. [Technical Program], http://www.usenix.org/publications/library/proceedings/sec99/full_papers/whitten/whitten_... Dec. 24, 2002, (pp. 1-22).

Hur Matthew et al., "Client Side Public Key Authentication Method and Apparatus With Short-Lived Certificates", http://toolkit.dialog.com/intranet/cgi/present?STYLE=621875714&PRESENT=DB=349, Dec. 10, 2002, (pp. 1-18).

R. Rivest, "*The MD4 Message-Digest Algorithm*", Apr. 1992, MIT Laboratory for Computer Science and RSA Data Security, Inc., pp. 1-22.

R. Rivest, "*The MD5 Message-Digest Algorithm*", Apr. 1992, MIT Laboratory for Computer Science and RSA Data Security, Inc., pp. 1-18.

Federal Information Processing Standards Publication 180-1, "*Secure Hash Standard*", Apr. 17, 1995, pp. 1-15.

\* cited by examiner

*Primary Examiner*—Emmanuel L. Moise
*Assistant Examiner*—Jeffrey D. Popham
(74) *Attorney, Agent, or Firm*—Thelen Reid Brown Raysman & Steiner LLP

(57) ABSTRACT

Peer-to-peer authentication may be accomplished by sending a digital certificate to a responder, receiving a randomized codeword in response to the sending, creating a secure fingerprint based at least in part on the digital certificate and randomized codeword, creating a first bit sequence based at least in part on a first portion of the secure fingerprint and a second portion of the randomized codeword and indicating the first digital certificate is authenticated based upon whether the first bit sequence matches a second bit sequence received from the responder via an out-of-band communication in response to the sending. The size of the first bit sequence is less than the size of the secure fingerprint. According to another aspect, the first bit sequence is compared with a rendering of the second bit sequence, using an out-of-band communication, by associating the first bit sequence with one or more indices into an array of representations.

88 Claims, 14 Drawing Sheets

Step 1   Choose another peer with whom to authenticate.

Step 2.   Verify the resulting fingerprint with the other peer.

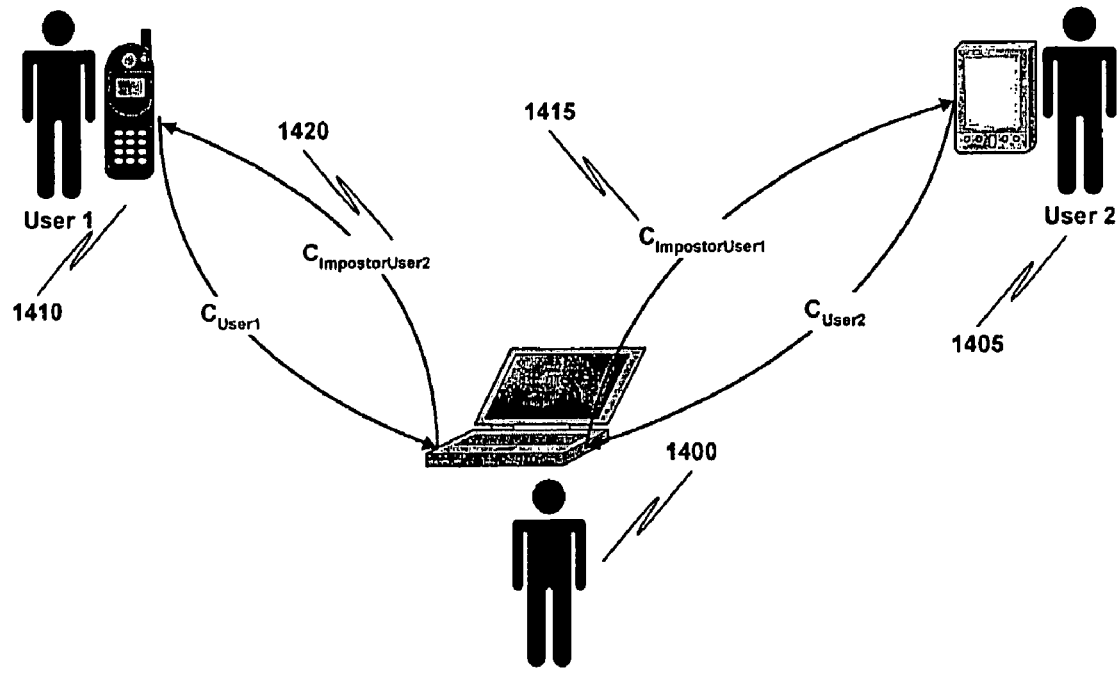

Initiate Attack

1. Impostor — $C_{ImpostorUser1}$ → User2
2. Impostor — $C_{ImpostorUser2}$ → User1
3. Impostor ←— $C_{User2}$ ———— User2
4. Impostor ←— $C_{User1}$ ———— User1
5. Encrypt Impostor-User1 & Impostor-User2 (all)
6. Impostor ←— W ————————— User2
7. Impmoster ←— W ————————— User1

FIG. 14B

Intercept Attack

1. Impostor ←— CUser2 ———— User2
2. Impostor ——— $C_{Impostor}$User2 —→ User1
3. Impostor ←— CUser2 ———— User1
4. Impostor ——— $C_{Impostor}$User1 —→ User2
5. Encrypt Impostor-User1 & Impostor-User2 (all)
6. Impostor ——— W' ———————→ User2
7. Impmoster ←— W ————————→ User1

CODEWORD-ENHANCED PEER-TO-PEER AUTHENTICATION

FIELD OF THE INVENTION

The present invention relates to the field of computer science. More particularly, the present invention relates to codeword-enhanced peer-to-peer authentication.

BACKGROUND OF THE INVENTION

Network security measures are becoming increasingly important as the contexts in which communication and information sharing take place expand in scope and location. Public network applications such as instant messaging systems on the open Internet provide only minimal security based on simple login procedures. In addition, the increased popularity of portable computing devices (i.e., PDA's, cell phones, etc.) has resulted in a greater need for the ability to share information between devices in environments where fixed network infrastructure varies or does not exist. Peer-to-peer networks can be established between the devices so that information can be shared. Each party in a peer-to-peer network has the same capabilities and either party can initiate a communication session.

The security of such networks generally comprises two aspects: encryption and authentication. A common security method is to use public-key infrastructure (PKI) for encryption. PKI works by providing each user with two "keys"— one that is public and one that is private. The private key is available only to the user. The public key is available to anyone via the user's digital certificate. The public key is used for encryption, while the private key is used for decryption. When an individual wants to transmit information securely, the individual encrypts the information with the public key of the recipient. That way, only the recipient has the correct private key to decrypt it.

In server-supported PKI networks, a central digital certificate authority can guarantee (by digitally signing) the identity of a digital certificate holder. But in networks where a central digital certificate authority is not present, the users generate or obtain their own digital certificates. Such a network is termed an "insecure network". As there is no central authority to guarantee identities, authentication must be carried out between peers. Authentication provides an assurance of the identity of a peer user in the network. Authentication is meant to counter impostor and man-in-the-middle attacks, where an intruder impersonates a trusted identity to establish a connection to a valid user and to intercept information.

Peer-to-peer authentication methods often include an interactive process by which compressed versions of the peer's digital certificate (called a digital fingerprint) are compared. The comparison may take place in real time at the moment when both peers are available online. One peer receives a copy of another peer's digital certificate via a network connection and generates a digital fingerprint from it. The peer then compares the digital fingerprint with a digital fingerprint generated by the other peer using the same transformation. This comparison is done using a communication outside the network. Examples of such "out-of-band" communications include a communication via phone, voice, face-to-face visual or facsimile.

The numeric representation used for the digital fingerprint is meant to be so large as to make it computationally infeasible for an impostor to easily generate the digital fingerprint. Digital fingerprints produced by these methods typically use 128 or 160 bits, resulting in hexadecimal representations of 32 or 40 digits, respectively. Unfortunately, the size of the digital fingerprints makes it difficult for two users to efficiently communicate and compares such large values. As a result, many users find the overhead of employing such security methods intrusive enough that they do use them.

Accordingly, a need exists in the art for a relatively efficient solution for peer-to-peer authentication while still providing an acceptable level of security. A further need exists for such a solution that makes it relatively easy for individuals to perform peer-to-peer authentication.

SUMMARY OF THE INVENTION

Peer-to-peer authentication may be accomplished by sending a digital certificate to a responder, receiving a randomized codeword in response to the sending, creating a secure fingerprint based at least in part on the digital certificate and randomized codeword, creating a first bit sequence based at least in part on a first portion of the secure fingerprint and a second portion of the randomized codeword and indicating the first digital certificate is authenticated based upon whether the first bit sequence matches a second bit sequence received from the responder via an out-of-band communication in response to the sending. The size of the first bit sequence is less than the size of the secure fingerprint. According to another aspect, the first bit sequence is compared with a rendering of the second bit sequence, using an out-of-band communication, by associating the first bit sequence with one or more indices into an array of representations.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 14A is a block diagram that illustrates man-in-the-middle attacks.

FIG. 14B is a sequence diagram that illustrates an "initiate" attack.

FIG. 14C is a sequence diagram that illustrates an "intercept" attack.

DETAILED DESCRIPTION

Figure 1:
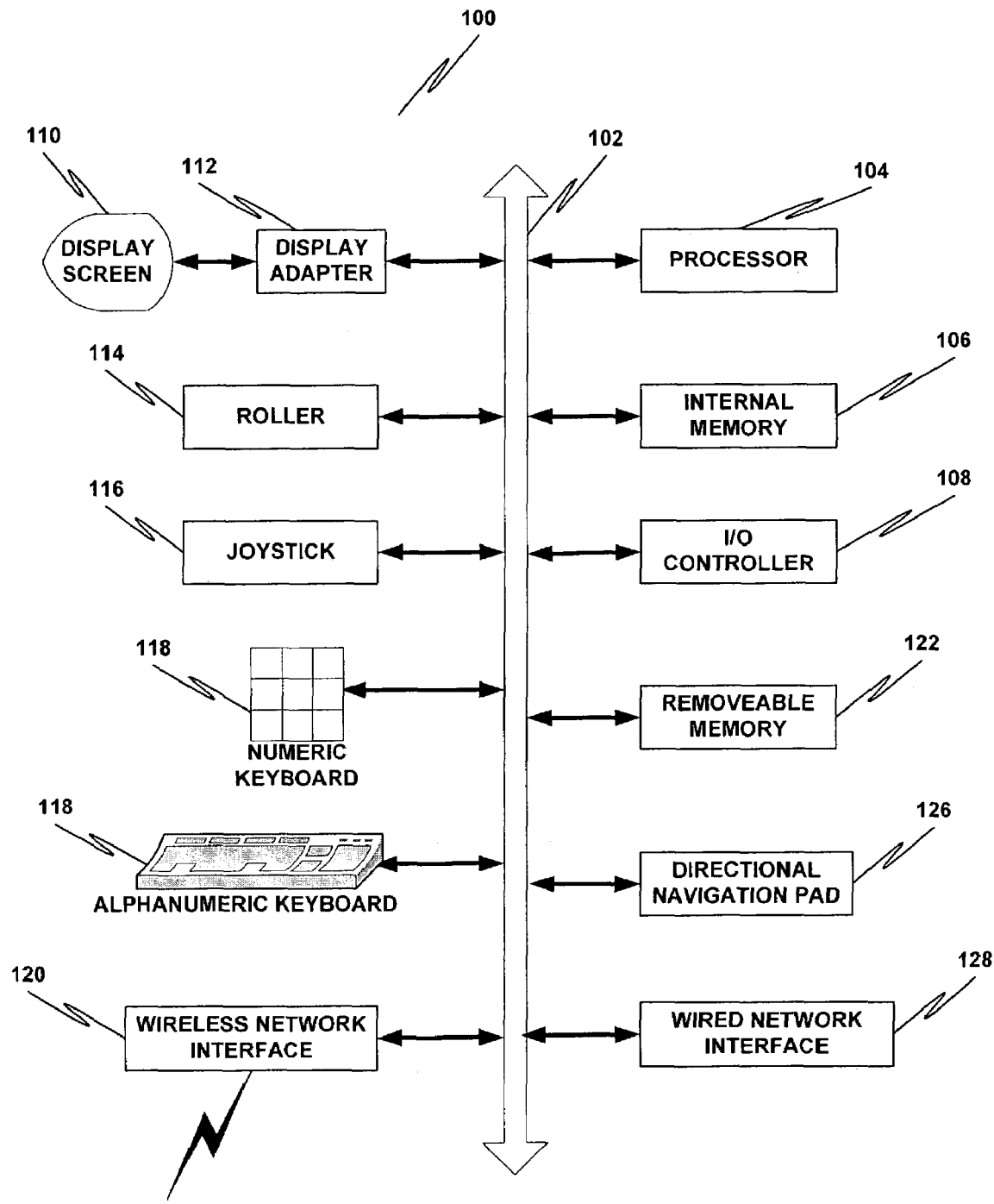
FIG. 1 is a block diagram of a computer system suitable for implementing aspects of the present invention.

Embodiments of the present invention are described herein in the context of run-time verification of software code. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available from Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "randomized" describes the result of a random or pseudo-random number generation process. A "randomized process" describes the application of such a result to a process. Methods of generating random and pseudo-random numbers are known by those skilled in the relevant art.

In the context of the present invention, the term "digital certificate" is defined as an assurance provided by a trusted third party that a public key belongs to an identity. The identity may be that of a person, corporation, or some other entity such as a Web server.

In the context of the present invention, the term "randomized codeword" or "codeword" is defined as a randomized identifier.

In the context of the present invention, the term "cryptographic one-way function" is defined as any cryptographic process that produces an output based upon an input, such that it is computationally infeasible to compute the input based upon the output. Exemplary cryptographic one-way functions comprise the SHA-1 algorithm, the MD4 algorithm and the MD5 algorithm. The SHA-1 algorithm is described in *Secure Hash Standard*, Federal Information Processing Publication 180-1, Apr. 17, 1995. The MD4 algorithm is described in R. Rivest, *The MD4 Message Digest Algorithm*, Request for Comments (RFC) 1320, MIT Laboratory for Computer Science and RSA Data Security, Inc., April 1992. The MD5 algorithm is described in Rivest. R. *The MD5 Message-Digest Algorithm*, Request for Comments (RFC) 1321, MIT Laboratory for Computer Science and RSA Data Security, Inc., April 1992.

In the context of the present invention, the term "digital fingerprint" is defined as a hash of an arbitrary byte sequence or a hash of a sequence of one or more byte sequences. By way of example, a digital fingerprint may comprise a checksum, a CRC (cyclic redundancy code), a message digest, or the like.

In the context of the present invention, the term "secure fingerprint" is defined as a digital fingerprint based at least in part on a digital certificate and a randomized codeword.

In the context of the present invention, the term "dynamic fingerprint" is defined as a portion of or transformation of a secure fingerprint.

In the context of the present invention, the term "insecure network" is defined as a network having no central digital certificate authority.

FIG. 1 depicts a block diagram of a system 100 suitable for implementing aspects of the present invention. As shown in FIG. 1, system 100 includes a bus 102 which interconnects major subsystems such as a processor 104, an internal memory 106 (such as a RAM), an input/output (I/O) controller 108, a removable memory 122 (such as a memory card), an external device such as a display screen 110 via display adapter 112, a roller-type input device 114, a joystick 116, a numeric keyboard 118, an alphanumeric keyboard 118, a directional navigation pad 126, a wired network interface 128 and a wireless network interface 120. Many other devices can be connected. Wireless network interface 120 may be used to interface to a local or wide area network (such as the Internet) using any network interface system known to those skilled in the art.

Many other devices or subsystems (not shown) may be connected in a similar manner. Also, it is not necessary for all of the devices shown in FIG. 1 to be present to practice the present invention. Furthermore, the devices and subsystems may be interconnected in different ways from that shown in FIG. 1. Code to implement the present invention may be operably disposed in internal memory 106 or stored on storage media such as removable memory 122, a floppy disk a CD-ROM.

According to one embodiment of the present invention, a randomized codeword is used to reduce the effective digital fingerprint that users compare to a smaller number of bits, without reducing the security guaranteed by the original larger digital fingerprint. According to another embodiment of the present invention, a reduced fingerprint is mapped into easily compared, intuitive representations using a dictionary look-up technique.

Figure 2:
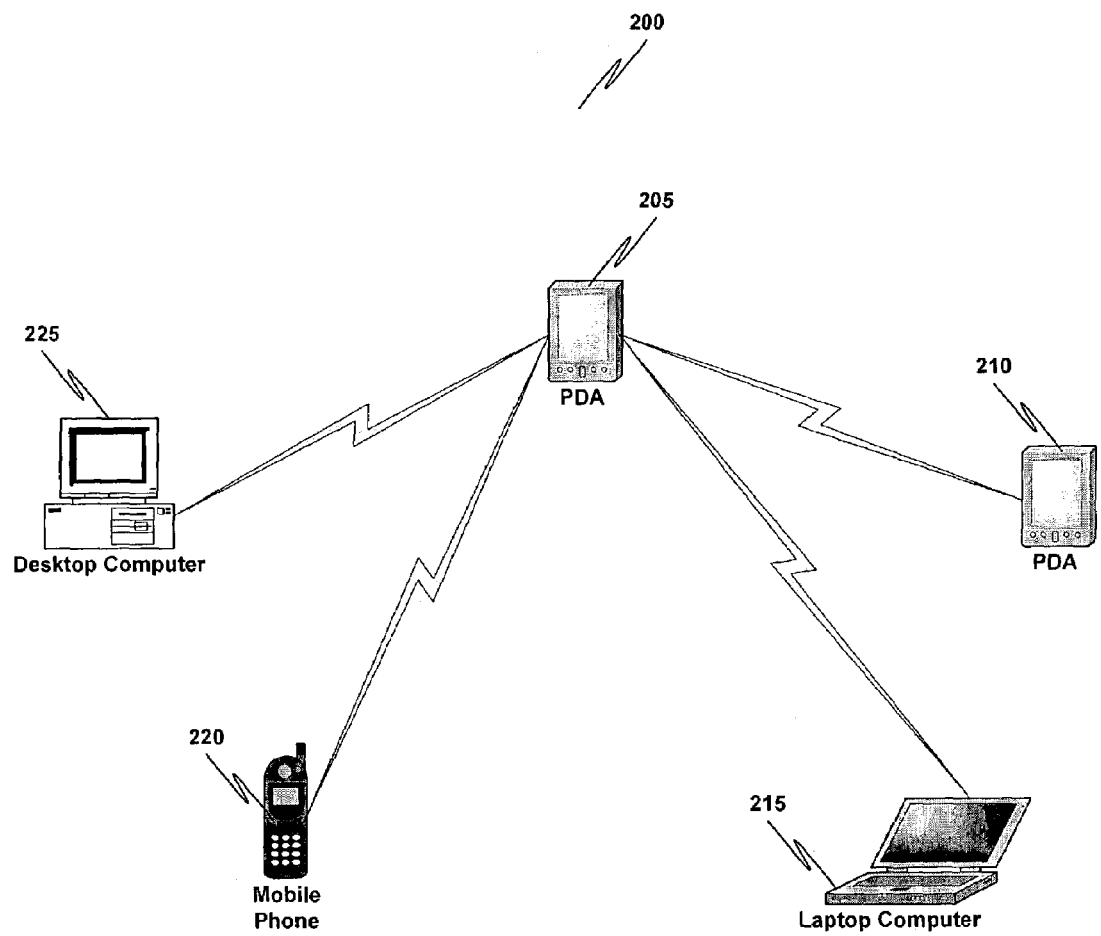
FIG. 2 is a block diagram of a peer-to-peer network in accordance with one embodiment of the present invention.

Turning now to FIG. 2, a block diagram of a peer-to-peer network in accordance with one embodiment of the present invention is presented. FIG. 2 illustrates how electronic devices are arranged in a peer-to-peer network 200 with a need for a secure connection. Specifically, the peer-to-peer network 200 has multiple electronic devices (205, 210, 215, 220, 225) in communication with one another. The peer-to-peer network 200 may be a wired network or a wireless network as shown. For the wireless network shown in FIG. 2, electronic devices such as Personal Digital Assistants (PDAs) 205-210, laptop computer 215, mobile phone 220 and desktop computer 225 each contain some type of wireless networking device such as a wireless modem or wireless network access device. Embodiments of the present invention may be used with any type of physical network such as Bluetooth™, LAN, Ethernet, IEEE 802.11a, IEEE 802.11b, etc. The electronic devices (205, 210, 215, 220 and 225) are configured in a peer-to-peer network. Each of the devices contains some type of processor, memory and display.

Additionally, embodiments of the present invention may be used with any insecure network, including peer-to-peer networks and client/server networks that have no central digital certificate authority.

As previously mentioned above, it is desirable to establish a secure connection between the electronic devices (205, 210, 215, 220, 225). For instance, device 205 would want to establish secure connections with devices 210, 215, 220 and 225.

As mentioned previously, authentication takes place "on the fly" (i.e., occurs in real time at the moment when both peers are available online). Additionally, the peers communicate out-of-band to assure each other of their identities at the time of authentication. According to embodiments of the present invention, an extra encoding step is employed at the time of authentication. A randomized number called a "randomized codeword" or "codeword" is determined at the time of authentication and added to the digital certificates before they are transformed by a secure fingerprint generation step. The authenticating peers add this randomized codeword to each peer's digital certificate. The resulting binary representation of the combined digital certificate and randomized codeword is passed to a secure hashing function that generates a secure fingerprint. Then, a smaller set of bits used for the dynamic fingerprint is extracted from the secure fingerprint and some or all of the randomized codeword bits added again to it to create a bit sequence (a sequence of bits). The bit sequence may be used as an index or set of indices for dictionary lookup into a vector of simple representations (such as words, images, symbols or sounds, or the like) that can be easily and accurately differentiated when compared.

Figure 3:
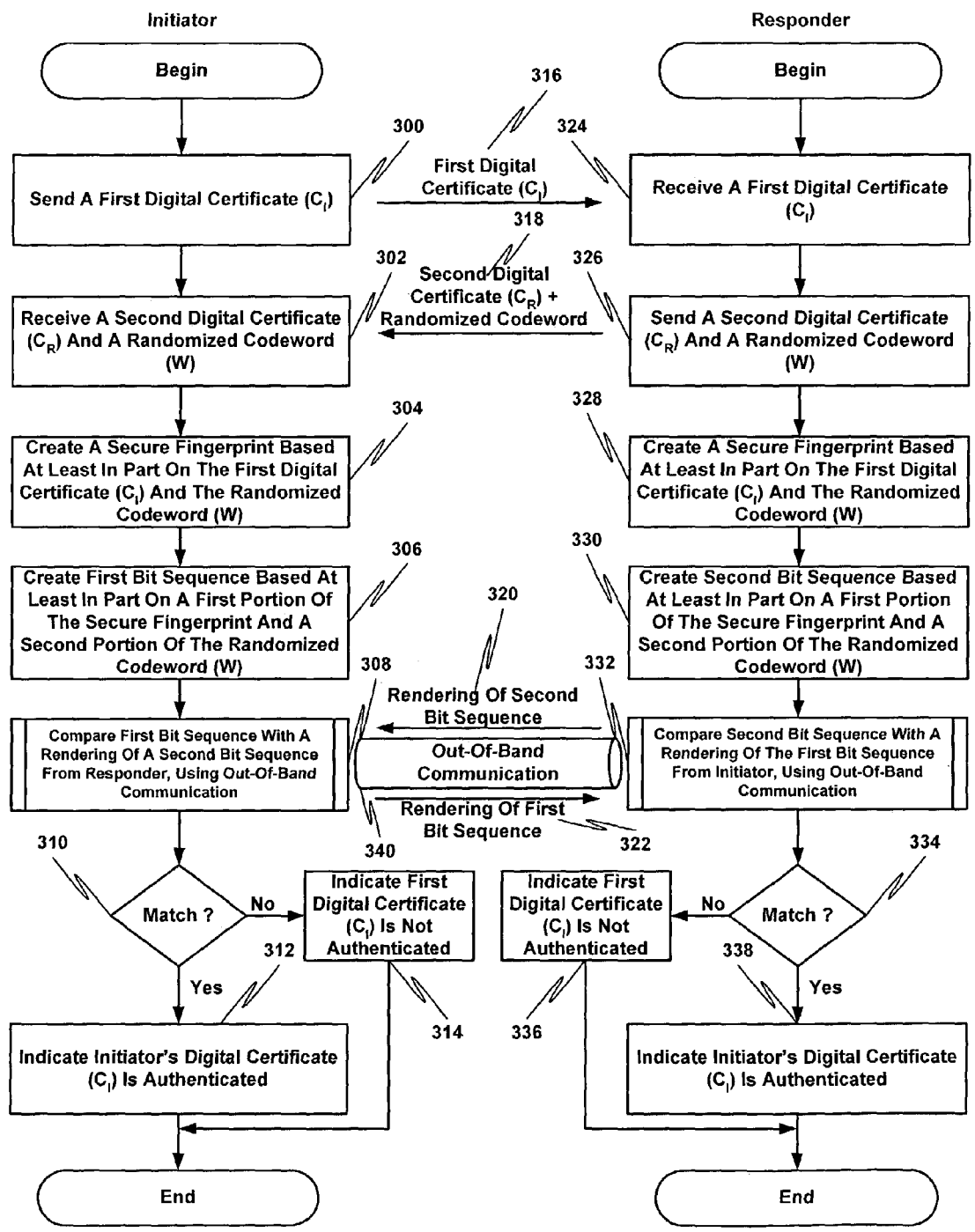
FIG. 3 is a flow diagram that illustrates a method for peer-to-peer authentication in accordance with one embodiment of the present invention.

Turning now to FIG. 3, a flow diagram that illustrates a method for peer-to-peer authentication in accordance with one embodiment of the present invention is presented. FIG. 3 illustrates a scenario where an initiator and a responder wish to authenticate each other's identities. As in other digital fingerprint methods, each peer generates two digital fingerprints: one for her or his own digital certificate and one from that sent by the other peer. Then the peers compare these digital fingerprints. At 300, the initiator sends the responder a copy of the initiator's digital certificate ($C_I$). At 326 the responder replies with the responder's randomized codeword (W) having a value from 1 to m, and optionally a copy of the responder's digital certificate ($C_R$). To prevent obfuscation of the present invention, the process of only one side of this transaction, that of the authenticating initiator's digital certificate ($C_I$), is described. This process is symmetric for authenticating responder's digital certificate ($C_R$). FIG. 3 illustrates authenticating the initiator's digital certificate ($C_I$).

Still referring to FIG. 3, at 304 a secure fingerprint based at least in part on the first digital certificate and the randomized codeword is created. According to one embodiment of the present invention, the secure fingerprint is created by applying a cryptographic one-way function to the digital certificate and at least part of the randomized codeword. The same process (304) is performed by the responder at 328. At 306, a first bit sequence 322 based at least in part on a dynamic fingerprint and a second portion of the randomized codeword is created. The dynamic fingerprint comprises a first portion of the secure fingerprint. The number of bits of the dynamic fingerprint is less than the number of bits in the secure fingerprint. According to one embodiment of the present invention, the dynamic fingerprint comprises the first ten bits of the secure fingerprint. Those of ordinary skill in the art will recognize that other methods of generating a smaller fingerprint are possible. The same process (306) is performed by the responder at 330. At 308, the initiator compares the first bit sequence 322 with a second bit sequence 320 received from the responder via an out-of-band communication 340. The same process (308) is performed by the responder at 332. At 310, a determination is made regarding whether there is a match. If there is no match, an indication that the first digital certificate is not authenticated is made at 314. Such an indication signifies that the responder cannot authenticate the first digital certificate 316 that the responder received from the initiator at 324. If there is a match, an indication that the first digital certificate is authenticated is made at 312.

According to one embodiment of the present invention, the bit sequences created at 306 and 330 are partitioned into v equal-sized indexes, each having a bit-length of Y/v, where Y is the number of bits in the randomized codeword plus the number of bits in the dynamic fingerprint. The indices index into an array of easily comparable tokens (such as words, images, symbols or sounds). The dynamic fingerprint and the randomized codeword are thus rendered to the user as a group of v tokens, each chosen from a set of $2^{Y/v}$ possibilities. The peers then contact each other out-of-band (e.g., via telephone, facsimile, secure email, or the like) and check the tokens related to $C_I$. This ensures that the users are comparing both the fingerprint and part of the actual randomized codeword. The responder can thus verify that the digital fingerprint generated for the initiator's digital certificate $C_I$ is the same as the one the initiator generated from her own digital certificate $C_I$.

According to one embodiment of the present invention, the dynamic fingerprint comprises ten bits and the randomized codeword comprises eight bits. This produces an 18-bit index vector. Dividing this into 6-bit indices results in 3 words, each chosen from a possible "dictionary" of 64 ($2^6$) candidates.

The particular sizes of the dynamic fingerprint and randomized codeword are for purposes of illustration only and are not intended to be limiting in any way. Those of ordinary skill in the art will recognize that different sized dynamic fingerprints and randomized codewords may be used. Moreover, different numbers of tokens may be used. By way of example, the index vector may also be divided into two nine-bit indices, three four-bit and one sixteen-bit indices, or any other combinations.

According to one embodiment of the present invention, processes 300-306 and 310-314 are performed automatically by the initiator's device when the initiator indicates the peer to authenticate, and process 308 is performed by the initiator. Likewise, processes 324-330 and 334-338 are performed by the responder's device upon receiving a digital certificate from another peer requesting authentication, and process 332 is performed by the responder. Requiring that only the final step of out-of-band comparison (308, 332) be explicitly managed and carried out by the two users retains the security of traditional fingerprint methods against impersonation attacks while improving usability.

Figure 4:
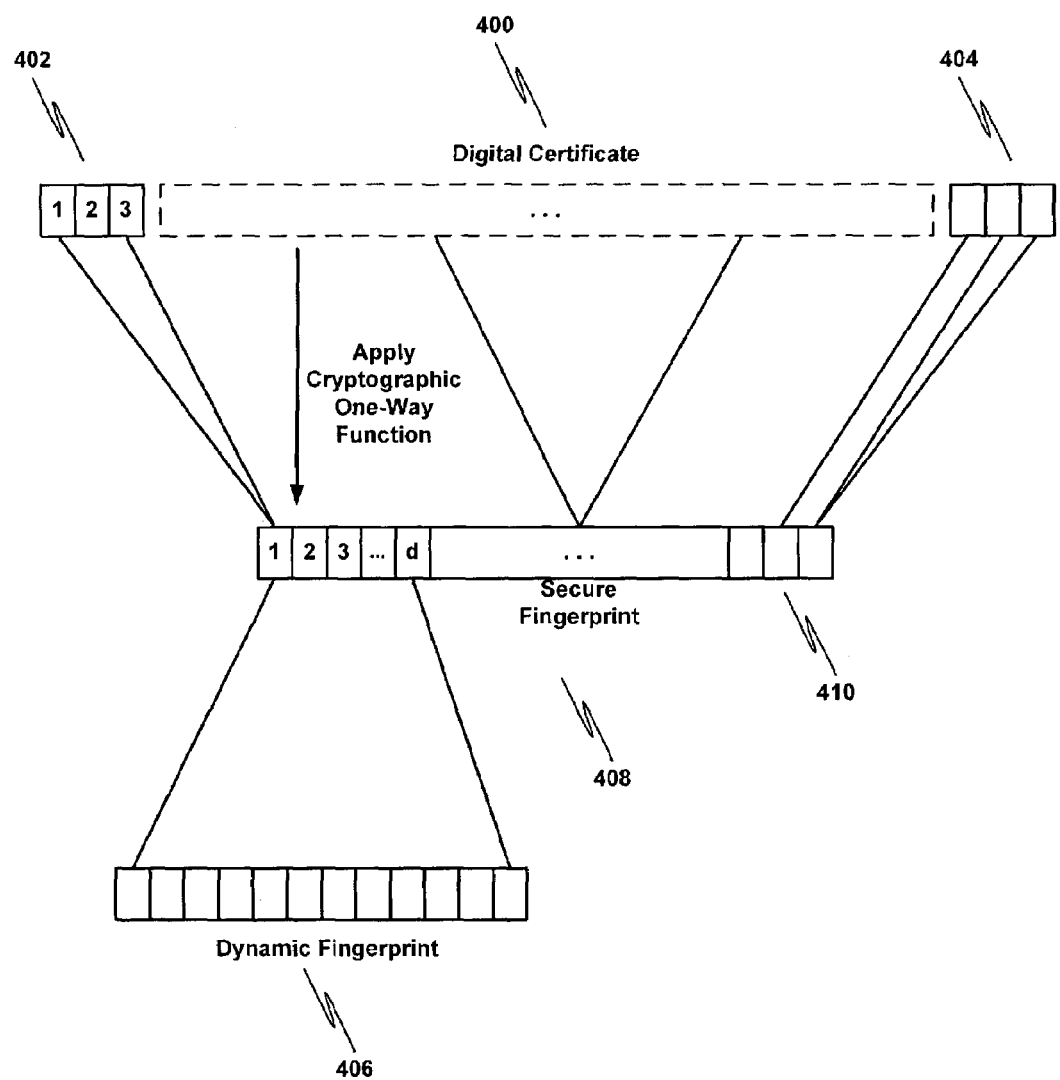
FIG. 4 is a block diagram that illustrates creating a dynamic fingerprint based at least in part on the result of applying a cryptographic one-way function to a digital certificate in accordance with one embodiment of the present invention.

Turning now to FIG. 4, a block diagram that illustrates creating a dynamic fingerprint based at least in part on the result of applying a cryptographic one-way function to a digital certificate in accordance with one embodiment of the present invention is presented. As shown in FIG. 4, applying a cryptographic one-way function to the digital certificate 400 results in a secure fingerprint 408 having a smaller number of bits than the digital certificate 400. A dynamic fingerprint 406 is created using at least part of the secure fingerprint 408.

Figure 5:
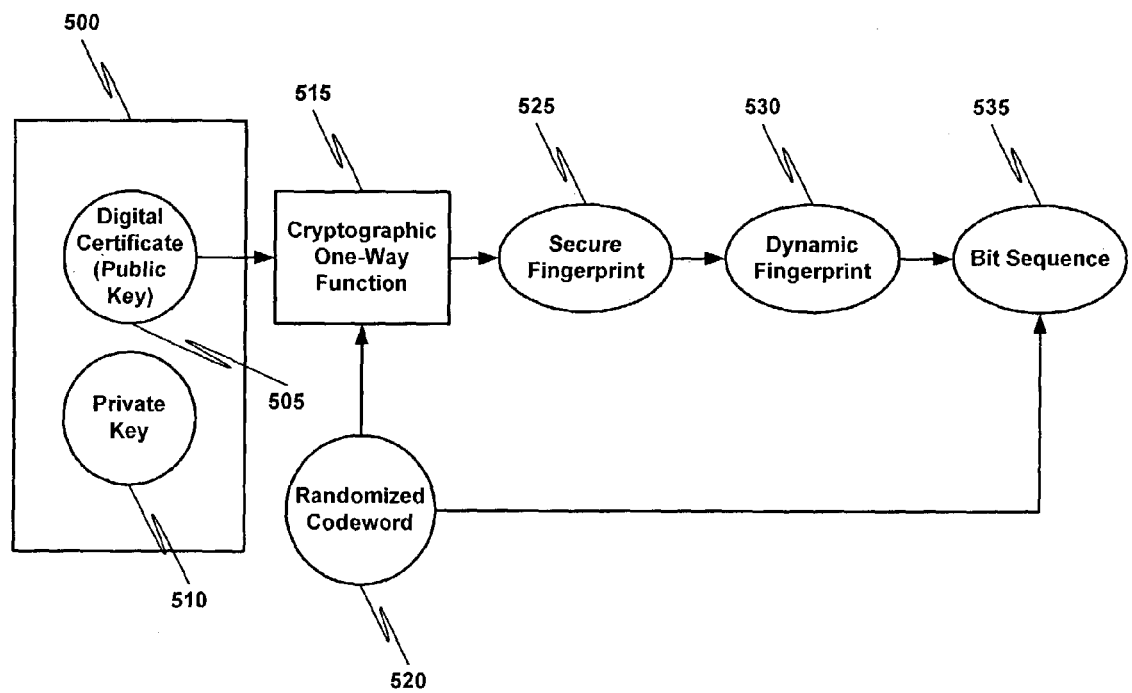
FIG. 5 is a block diagram that illustrates creating a bit sequence based at least in part on a dynamic fingerprint and a randomized codeword in accordance with one embodiment of the present invention.

Turning now to FIG. 5, a block diagram that illustrates creating a bit sequence based at least in part on a dynamic fingerprint and a randomized codeword in accordance with one embodiment of the present invention is presented. As shown in FIG. 5, a cryptographic one-way function 515 is applied to a digital certificate 505 and a randomized codeword 520 to create a secure fingerprint 525 having a size that is less than the size of the digital certificate 505. The dynamic fingerprint 530 is based at least in part on the secure fingerprint 525. The bit sequence 535 is based at least in part on the dynamic fingerprint 530 and at least part of the randomized codeword 520.

Figure 6:
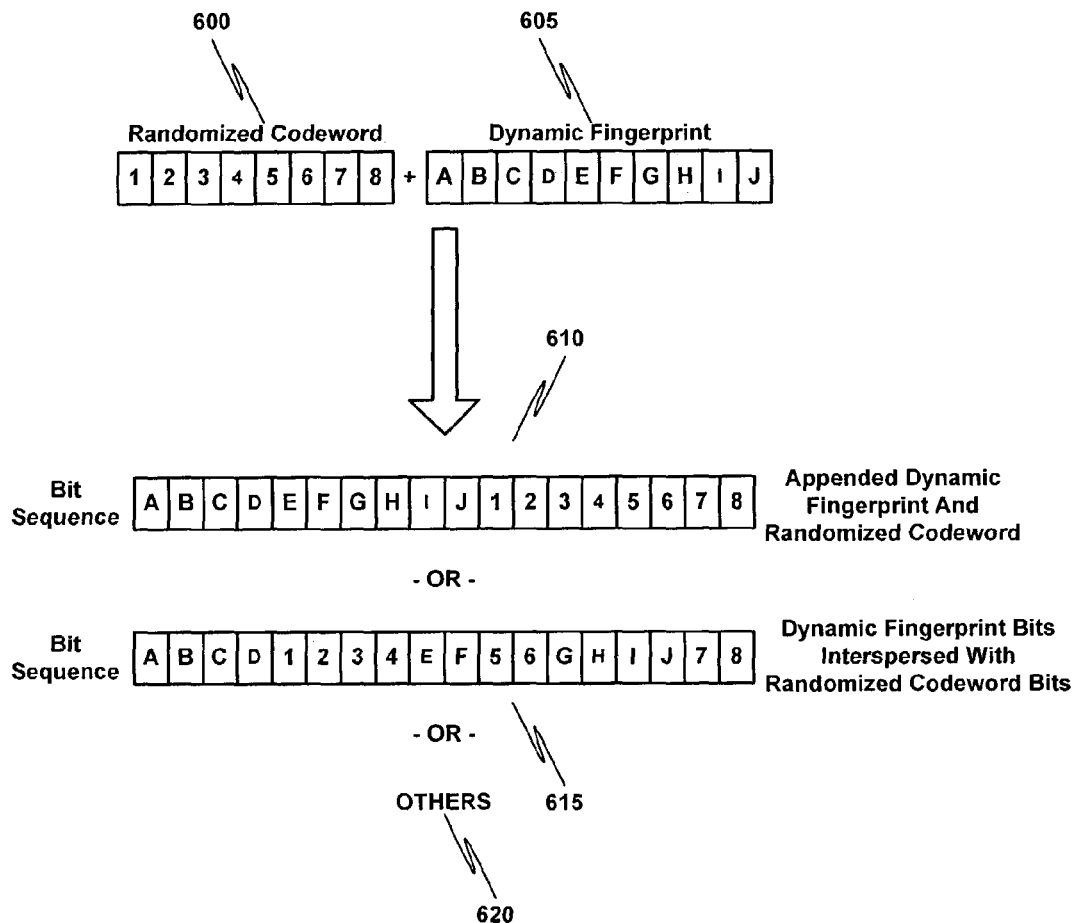
FIG. 6 is a block diagram that illustrates combining a randomized codeword and a dynamic fingerprint in accordance with embodiments of the present invention.

Turning now to FIG. 6, a block diagram that illustrates combining a randomized codeword and a dynamic fingerprint in accordance with embodiments of the present invention is presented. According to one embodiment of the present invention, the randomized codeword 600 is appended to the dynamic fingerprint 605 to create a bit sequence 610. According to another embodiment of the present invention, the randomized codeword bits 600 are interspersed with the dynamic fingerprint bits 605 to create a bit sequence 610. Those of ordinary skill in the art will recognize other ways of combining a randomized codeword 600 with a dynamic fingerprint 605. By way of example, the randomized codeword 600, the dynamic fingerprint 605, or both, may undergo further processing before being combined to create the bit sequence.

User Interface

Figure 7:
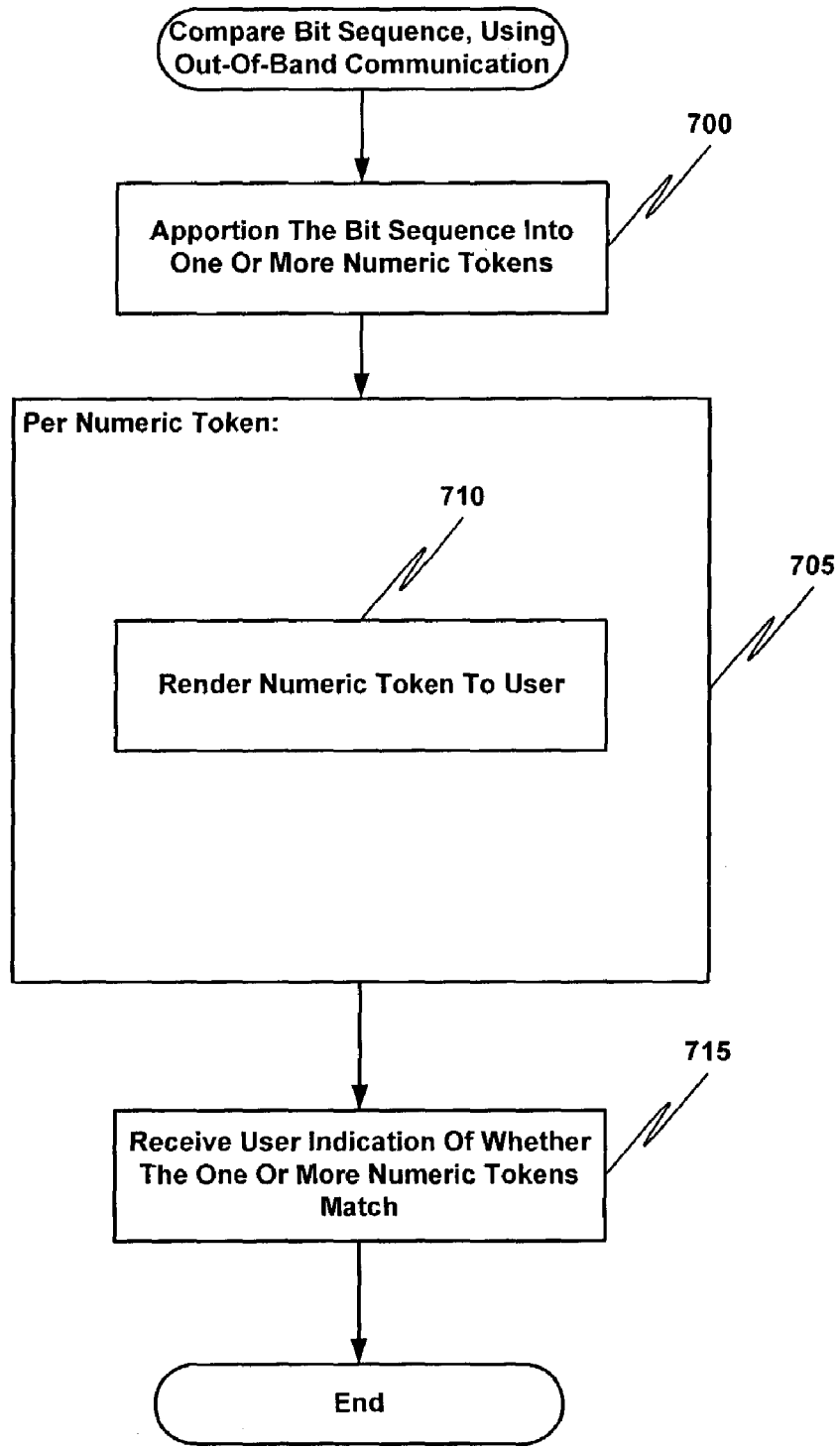
FIG. 7 is a flow diagram that illustrates a method for comparing a first bit sequence with a rendering of a second bit sequence received via an out-of-band communication, by associating the first bit sequence with one or more numeric tokens, in accordance with one embodiment of the present invention.
Figure 8:
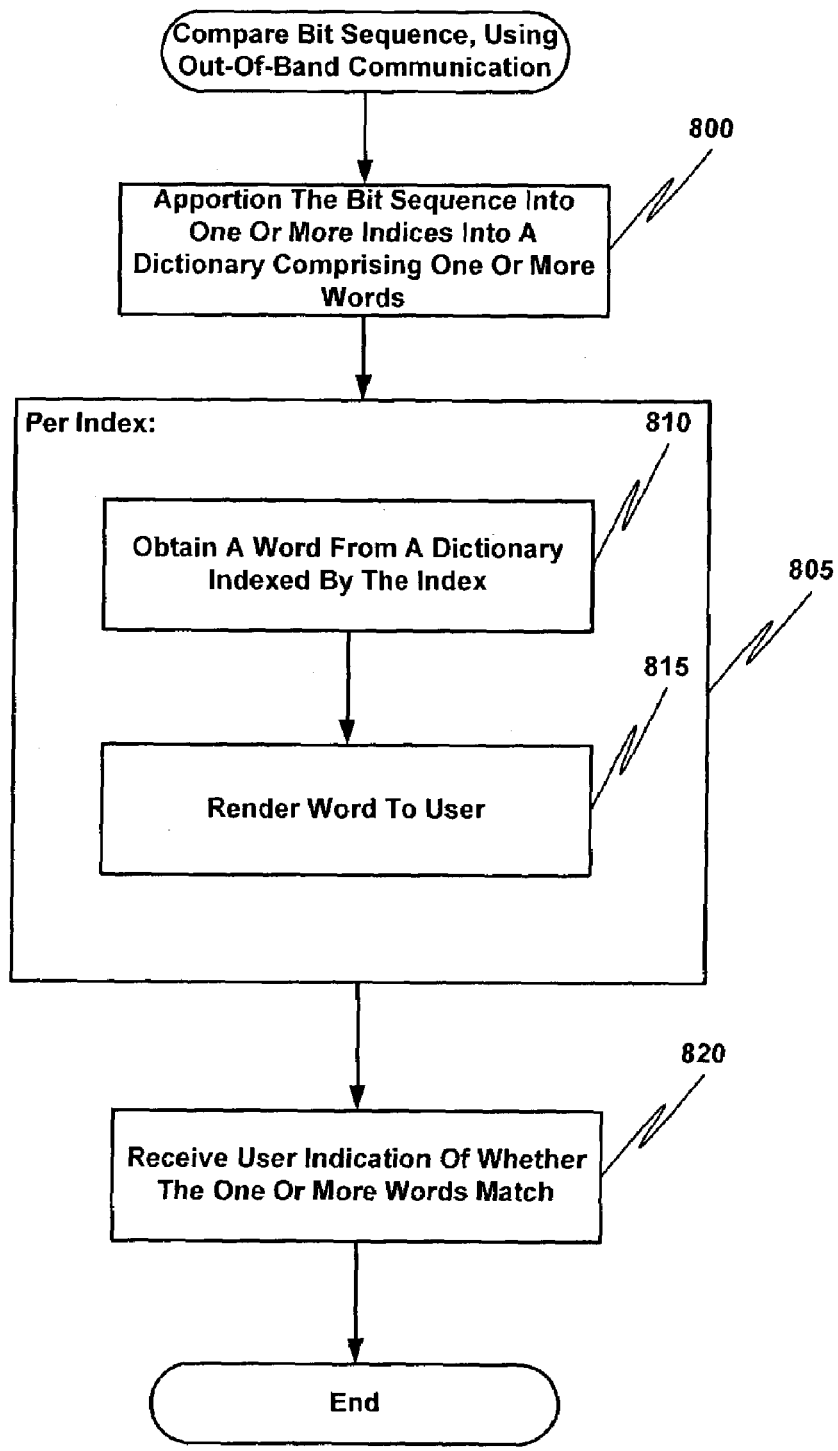
FIG. 8 is a flow diagram that illustrates a method for comparing a first bit sequence with a rendering of a second bit sequence received via an out-of-band communication, by associating the first bit sequence with one or more words, in accordance with one embodiment of the present invention.
Figures 9, 9A, 9B:
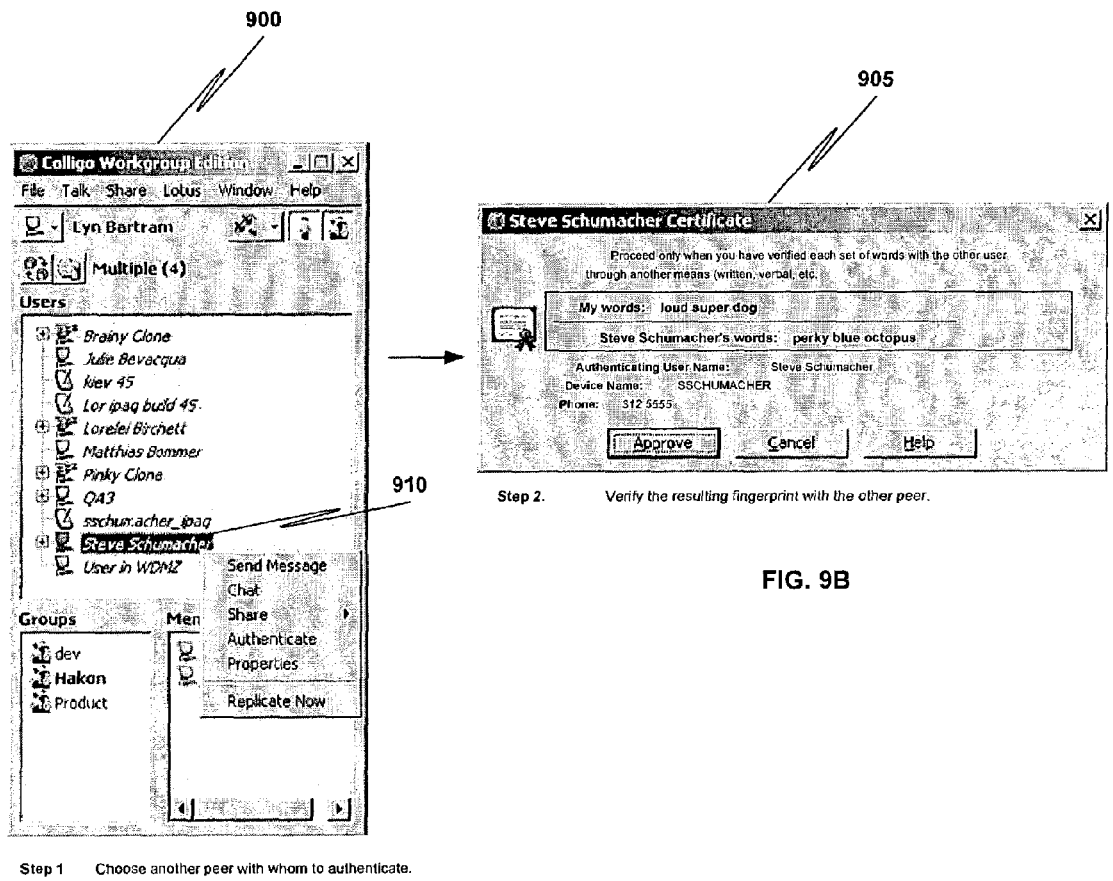
FIG. 9A is a screenshot that illustrates comparing a first bit sequence with a rendering of a second bit sequence received via an out-of-band communication, by associating the first bit sequence with one or more words, in accordance with one embodiment of the present invention.
FIG. 9B is a screenshot that illustrates comparing a first bit sequence with a rendering of a second bit sequence received via an out-of-band communication, by associating the first bit sequence with one or more words, in accordance with one embodiment of the present invention.
Figure 10:
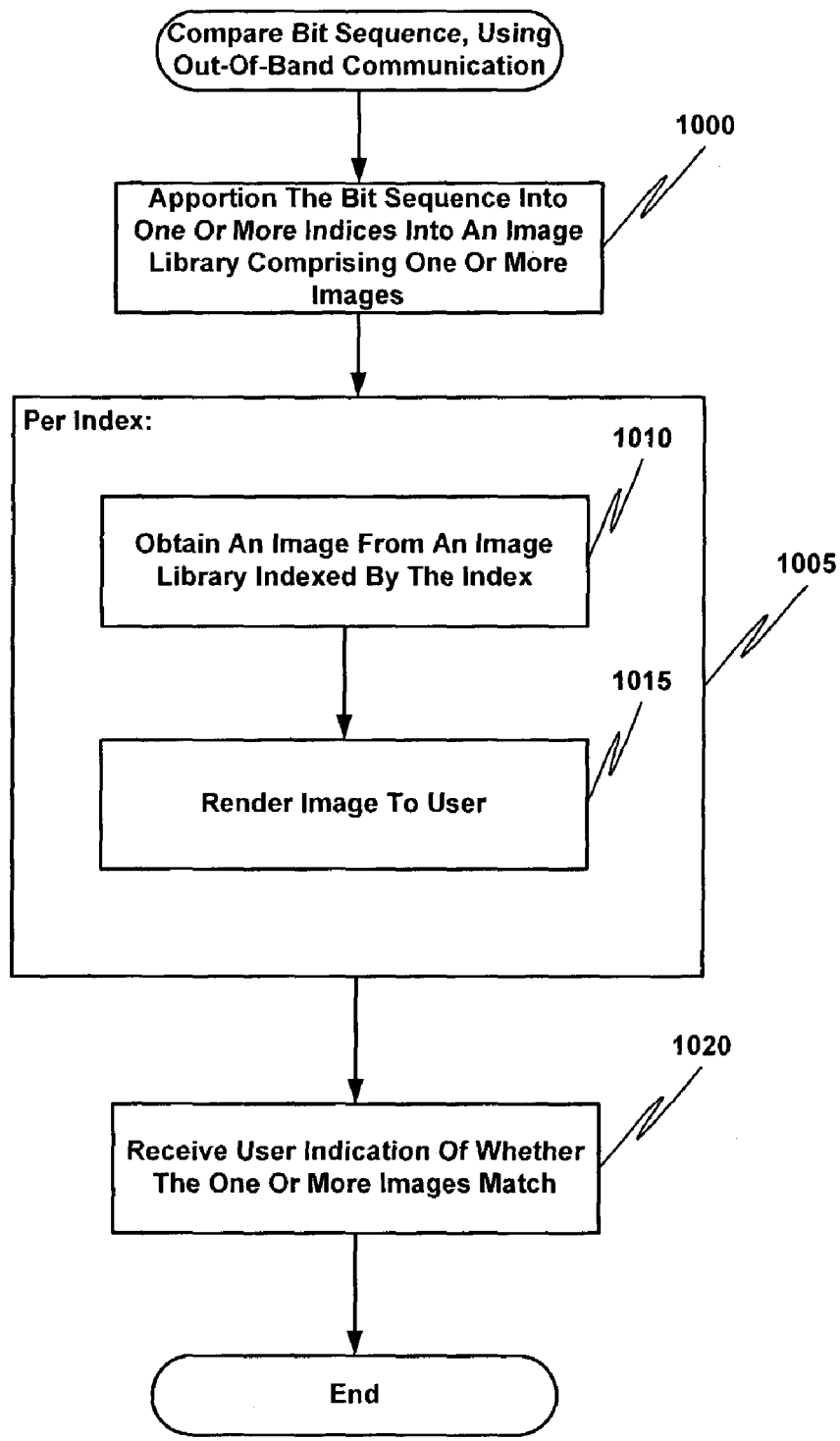
FIG. 10 is a flow diagram that illustrates a method for comparing a first bit sequence with a rendering of a second bit sequence received via an out-of-band communication, by associating the first bit sequence with one or more images, in accordance with one embodiment of the present invention.
Figure 11:
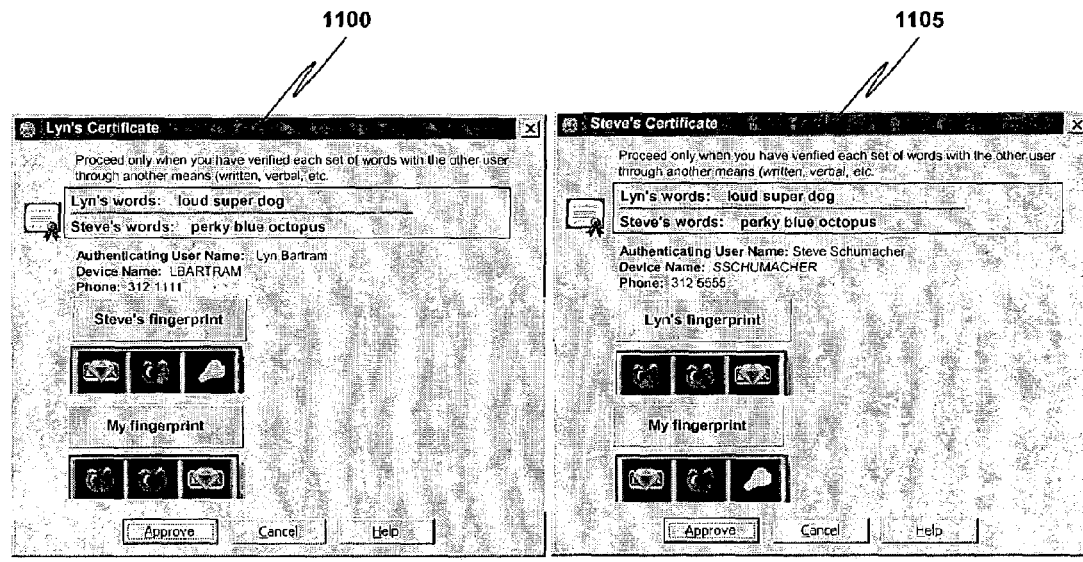
FIG. 11A is a screenshot that illustrates comparing a first bit sequence with a rendering of a second bit sequence received via an out-of-band communication, by associating the first bit sequence with one or more images, in accordance with one embodiment of the present invention.
FIG. 11B is a screenshot that illustrates comparing a first bit sequence with a rendering of a second bit sequence received via an out-of-band communication, by associating the first bit sequence with one or more images, in accordance with one embodiment of the present invention.
Figure 12:
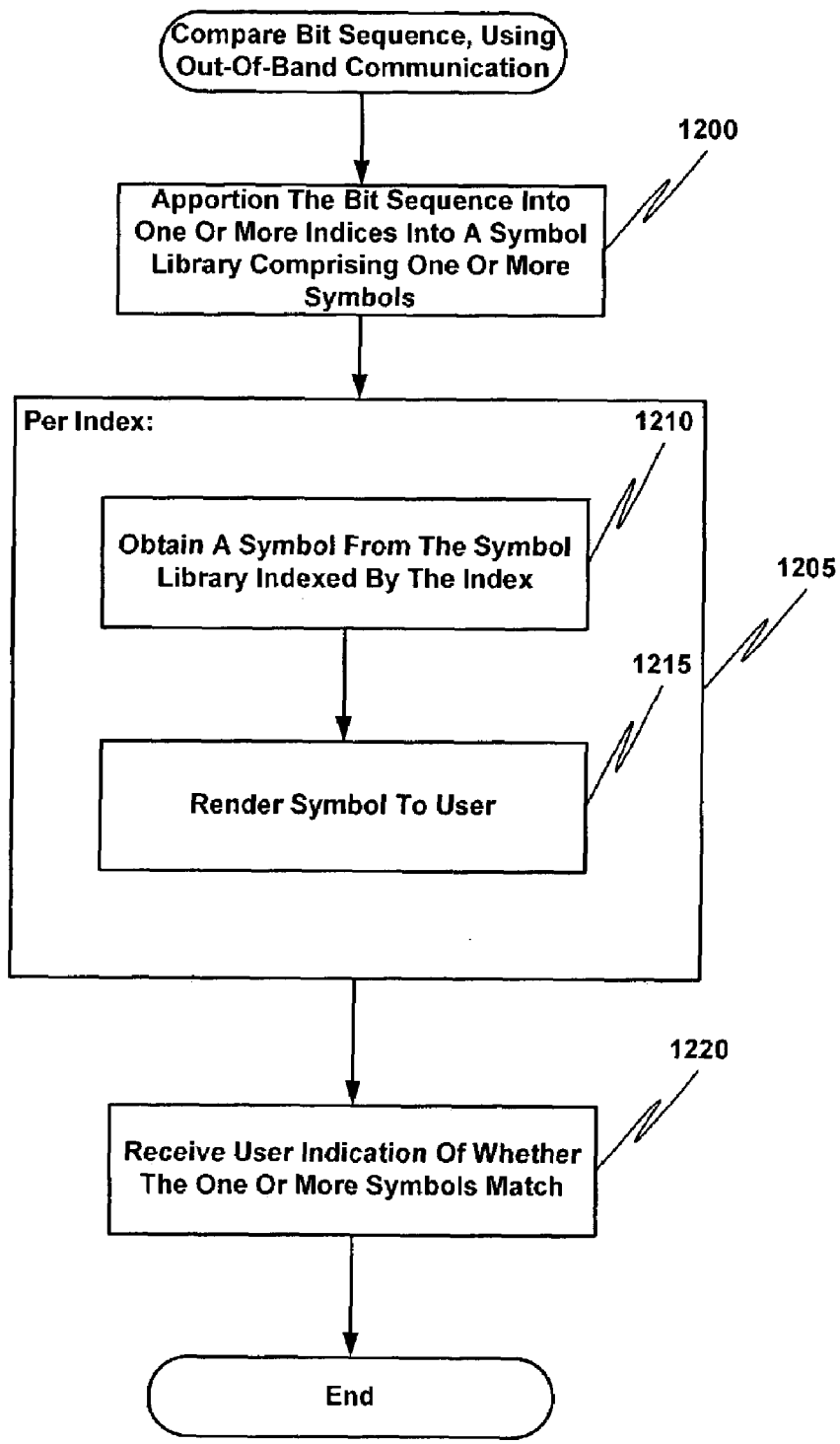
FIG. 12 is a flow diagram that illustrates a method for comparing a first bit sequence with a rendering of a second bit sequence received via an out-of-band communication, by associating the first bit sequence with one or more symbol, in accordance with one embodiment of the present invention.
Figure 13:
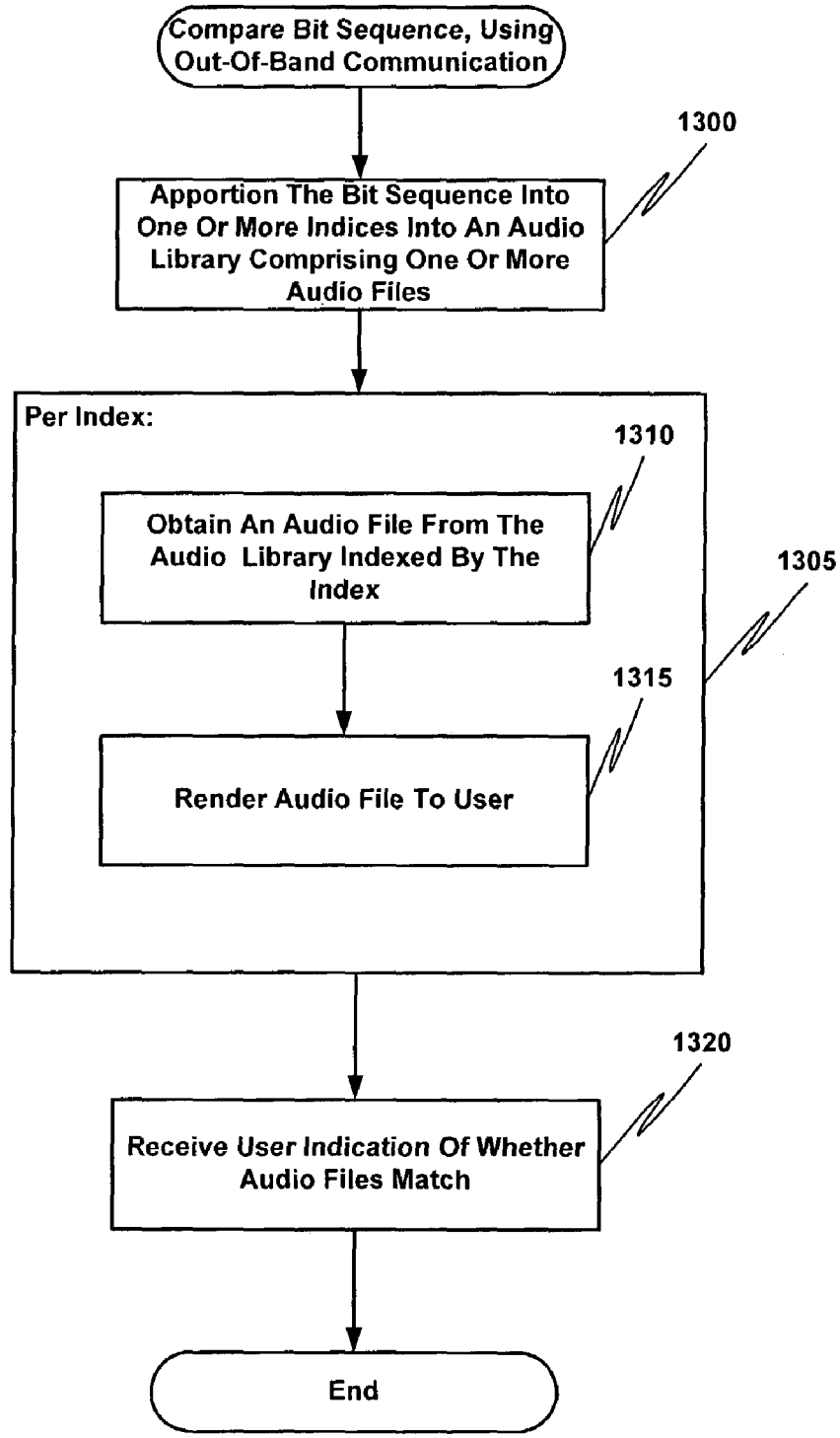
FIG. 13 is a flow diagram that illustrates a method for comparing a first bit sequence with a rendering of a second bit sequence received via an out-of-band communication, by associating the first bit sequence with one or more audio file, in accordance with one embodiment of the present invention.

FIGS. 7-13 illustrate methods for comparing a first bit sequence with a rendering of a second bit sequence, using an out-of-band communication, in accordance with embodiments of the present invention. FIG. 7 illustrates associating a bit sequence as discussed above with one or more numeric tokens. FIGS. 8 and 9 illustrate associating the bit sequence with one or more words. FIGS. 10 and 11 illustrate associating the bit sequence with one or more images. FIG. 12 illustrates associating the bit sequence with one or more symbol. FIG. 13 illustrates associating the bit sequence with one or more audio file.

Turning now to FIG. 7, a flow diagram that illustrates a method for comparing a first bit sequence with a rendering of a second bit sequence received via an out-of-band communication, by associating the first bit sequence with one or more numeric tokens, in accordance with one embodiment of the present invention is presented. FIG. 7 provides more detail for reference numerals 308 and 332 of FIG. 3. At 700, the first bit sequence is apportioned into one or more numeric tokens. At 710, the one or more numeric tokens are rendered to a user. At 715, an indication of whether the one or more numeric tokens match is received from a user.

According to embodiments of the present invention, a dictionary lookup is used to map a Y-bit number or bit sequence into a small sequence of v tokens (such as words, sounds, images or graphic symbols) by dividing the number into Y/v "indices", where each index produces a token in the sequence. Each index indexes into a predefined vector of $2^{Y/v}$ tokens. For example, a 16-bit number can be divided into 2 8-bit indices, indexing into a vector of 256 ($2^8$) words and producing a sequence of two known words as a unique bit sequence representation.

According to one embodiment of the present invention, Y=18 and v=3 (an 18-bit number is mapped to a sequence of three six-bit tokens). This requires a vector of 64 distinct tokens. Upon accepting an authentication transaction, the user sees only 2 sets of 3 simple, easily compared representations.

Turning now to FIG. 8, a flow diagram that illustrates a method for comparing a first bit sequence with a rendering of a second bit sequence received via an out-of-band communication, by associating the first bit sequence with one or more words, in accordance with one embodiment of the present invention is presented. FIG. 8 provides more detail for reference numerals 308 and 332 of FIG. 3. At 800, the first bit sequence is apportioned into one or more indices into a dictionary comprising one or more words. Box 805 is repeated per index. At 810, a word is obtained from a dictionary indexed by the index. At 815, the word is rendered to a user. At 820, an indication of whether the one or more words matched is received from a user.

Turning now to FIG. 9A, a screenshot that illustrates a method for comparing a first bit sequence with a rendering of a second bit sequence received via an out-of-band communication, by associating the first bit sequence with one or more words, in accordance with one embodiment of the present invention is presented. As shown in FIG. 9A, a current user (the user viewing the screen) chooses another peer 910 with whom to authenticate. The resulting display is shown in FIG. 9B.

Turning now to FIG. 9B, a screenshot that illustrates a method for comparing a first bit sequence with a rendering of a second bit sequence received via an out-of-band communication, by associating the first bit sequence with one or more words, in accordance with one embodiment of the present invention is presented. FIG. 9B provides more detail for reference numeral 308 of FIG. 3, where an initiator compares a first bit sequence determined by the initiator's device, with a rendering of a second bit sequence determined by the responder's device and communicated to the initiator via an out-of-band communication. A user presented with the screenshot of FIG. 9B would use an out-of-band communication means to compare the words determined by the initiator's device with the words determined by the responder's device.

According to another embodiment of the present invention, the tokens comprise common words. The determination regarding whether a word is "common" may be based at least in part on the word's frequency of use in one or more oral or written utterance, such as a novel, dictionary, transcript, or the like.

Turning now to FIG. 10, a flow diagram that illustrates a method for comparing a first bit sequence with a rendering of a second bit sequence received via an out-of-band communication, by associating the first bit sequence with one or more images, in accordance with one embodiment of the present invention is presented. FIG. 10 provides more detail for reference numerals 308 and 332 of FIG. 3. At 1000, the first bit sequence is apportioned into one or more indices into an image library comprising one or more images. Box 1005 is repeated per index. At 1010, an image is obtained from a dictionary indexed by the index. At 1015, the image is rendered to a user. At 1020, an indication of whether the one or more images matched is received from a user.

FIGS. 11A and 11B are screenshots that illustrate a method for comparing a first bit sequence with a rendering of a second bit sequence received via an out-of-band communication, by associating the first bit sequence with one or more images, in accordance with one embodiment of the present invention. The screenshot of FIG. 11A is from the perspective of a first peer (Lyn). The screenshot of FIG. 11B is from the perspective of the other peer (Steve). As shown, FIGS. 11A and 11B employ a method that apportions a bit sequence into three indices into an image library, and the three images indexed by the three indices are obtained from the library and displayed. The images illustrated in FIGS. 11A and 11B resemble slot machine output.

Turning now to FIG. 12, a flow diagram that illustrates a method for comparing a first bit sequence with a rendering of a second bit sequence received via an out-of-band communication, by associating the first bit sequence with one or more symbols, in accordance with one embodiment of the present invention is presented. FIG. 12 provides more detail for reference numerals 308 and 332 of FIG. 3. At 1200, the first bit sequence is apportioned into one or more indices into a symbol library comprising one or more symbols. Exemplary symbols include the "!", "@", "#", "$", "%", "^", "&", "*" symbols, and the like. Box 1205 is repeated per index. At 1210, a symbol is obtained from a symbol library indexed by the index. At 1215, the symbol is rendered to a user. At 1220, an indication of whether the one or more symbols matched is received from a user.

Turning now to FIG. 13, a flow diagram that illustrates a method for comparing a first bit sequence with a rendering of a second bit sequence received via an out-of-band communication, by associating the first bit sequence with one or more audio file, in accordance with one embodiment of the present invention is presented. FIG. 13 provides more detail for reference numerals 308 and 332 of FIG. 3. At 1300, the first bit sequence is apportioned into one or more indices into an audio library comprising one or more audio files. Box 1305 is repeated per index. At 1310, an audio file is obtained from an audio library indexed by the index. At 1315, the audio file is rendered to a user. At 1320, an indication of whether the one or more audio files matched is received from a user.

Different representations may be more suited to different conditions. For example, using images as representations may be suitable when the out-of-band communication used to compare fingerprints is a face-to-face conversation. Whereas using words as representations may be more appropriate when the out-of-band communication is a telephone conversation.

According to one embodiment of the present invention, a bit sequence may be rendered using a combination of the techniques discussed above. By way of example, a first portion of a bit sequence may be apportioned into one or more indices into an image library comprising one or more images, and a second portion of the bit sequence may be apportioned into one or more indices into a dictionary comprising one or more words. Those of ordinary skill in the art will recognize that other combinations are possible.

According to another embodiment of the present invention, the randomized codeword bits are distributed across the dynamic fingerprint bits such that the randomized codeword does not form a complete index value, thus reducing the possibility that the user will see the same representation in the same position for both digital certificates.

According to another embodiment of the present invention, the total number of representations from which a user may choose is based at least in part on the type of the representations. By way of example, while it is possible to have only two words to compare from a total set of $2^9$ words, it may be relatively difficult to compare a sequence of two images from a total set of $2^9$ images. On the other hand, it may be relatively easy for the user to compare a sequence of four images drawn from a total set of 32 possibilities.

According to another embodiment of the present invention, the total number of representations from which a user may choose is based at least in part on resource constraints of a user device. By way of example, storing a relatively small number of representations may be particularly suited for user devices that are relatively constrained in storage capacity.

Preventing Impersonation Attacks

A primary concern with authentication methods is their security against impersonation ("man-in-the-middle") attacks. Embodiments of the present invention require that an impostor exert an enormous effort (beyond the feasibility of modern computing) to generate matching combinations of digital certificate and randomized codeword. Even then the chance of the impostor finding a match is reduced to the statistical possibility $$\frac{k}{m},$$

where k is the number of randomized codeword values the impostor finds, and there are m possible values of the randomized codeword. There are two types of man-in-the-middle attacks: The initiate attack and the intercept attack. FIG. 14A is a block diagram that illustrates man-in-the-middle attacks. FIG. 14B is a sequence diagram that illustrates an "initiate" attack. FIG. 14C is a sequence diagram that illustrates an "intercept" attack. In the initiate attack, an impostor initiates the transaction on each side, pretending to be a responder to the initiator, and to be an initiator to the responder. The impostor is the initiator in both transactions. In an intercept attack, the impostor "traps" a request to begin an authentication transaction from either the initiator or the responder, interposes himself in the middle and replaces the real authentication request from the initiator with a false one from him. In this case, the impostor is the responder in the first transaction and the initiator in the second.

The impostor impersonates someone by making a false digital certificate from the name of the user to be impersonated and a public key (for which the impostor holds the corresponding private key). It is assumed the impostor knows the secure hashing algorithm that will generate the fingerprint. The impostor must find a digital certificate that will produce the same fingerprint as the real digital certificate before the impostor attempts a man-in-the-middle attack. The impostor can do this because mathematically there are many large digital certificate numbers that will generate the same digital fingerprint. Given current computing power, a one-way secure hash of length 80 bits or greater is considered to be unbreakable, as it requires the attacker to compute roughly $2^{80}$ digital certificates-hashes to match the fingerprint, making the task computationally infeasible. Thus, if the impostor has to compute roughly $2^{80}$ hashes before the impostor is sure to find a matching digital certificate, the system is considered secure.

Effect of Using Smaller Fingerprints without the Benefit of a Randomized Codeword Simply using a smaller fingerprint would reduce an impostor's effort, adversely affecting security. For example, suppose an impostor wants to insinuate himself as a man-in-the-middle between an initiator and a responder (an initiate attack). In this case, the impostor takes the initiator's digital certificate $C_I$ and performs the following transformations:

[$C_I$]>>secure hash>>[Initiator's n-bit fingerprint, n>=80]
>>Another transformation>>[Initiator's x-bit fingerprint] (where x is smaller than n)

The impostor may then generate several digital certificates with the initiator's name on them. The impostor subjects each digital certificate to the same two transformations and compares the result to the initiator's n-bit fingerprint. The impostor will eventually find a digital certificate that results in the same x-bit fingerprint. Note that there are a very large number of digital certificates that generate distinct n-bit fingerprints but generate the same x-bit fingerprint, so the use of a x-bit fingerprint makes the impostor's task much easier.

The impostor may perform the same procedure with the responder's digital certificate, eventually finding a digital certificate with the responder's name on it (but a public key that is different from responder's) that generates the same n-bit fingerprint. The impostor then attempts his attack. The impostor starts two instances of the application, one with the false digital certificate for the Initiator and one with the false digital certificate for the responder. From the instance impersonating the responder, the impostor starts an authentication with the initiator. From the instance impersonating the initiator, the impostor starts an authentication with the responder. If the responder calls the initiator and asks the initiator to verify the fingerprint of the in-band digital certificate, the initiator will read off a fingerprint that matches (even though the in-band digital certificate really belongs to the impostor).

Security Afforded by Embodiments of the Present Invention

Embodiments of the present invention protect an authentication system against both initiate and intercept attacks because an impostor must guess the randomized codeword and find at least one digital certificate that works with it.

In the intercept case, only one of these digital certificates must be found, assuming the impostor learns the randomized codeword by acting as the responder in the first transaction and uses it in the second transaction. In that case, the impostor's chances of success are limited to the percentage of randomized codeword values found that work with the first digital certificate. Only if the first transaction responder chooses one of the randomized codewords that the impostor has used will the impostor succeed.

In the initiate case, where the impostor must choose the codeword to generate digital certificates for both transactions with no prior knowledge, the impostor's probability of success is $$\frac{1}{m},$$

(where m is the range of values in the codeword) that the two parties will choose that same codeword. Thus, ensuring the method is secure for the intercept case ensures it is also secure for the other initiate case. In other words, finding that first digital certificate must require an unacceptable effort and deliver a very limited probability of success.

The level of security afforded by embodiments of the present invention benefit from the fact that an impostor does not know the dynamically defined randomized codeword until the responder chooses it, and the impostor is unlikely to be the responder in both cases. Furthermore, an impostor must choose and present at least one of the digital certificates (to the initiator and the responder) before the impostor knows the randomized codeword. Additionally, the initiator and the responder compare not only the fingerprints, but also the randomized codeword in their out-of-band communication, so the impostor cannot merely generate a digital certificate that produces the matching fingerprint but has to choose the correct codeword as well.

The following example illustrates a practical application of embodiments of the present invention, with reference to FIG. 14A. Suppose an initiator initiates an authentication with an impostor, thinking the impostor is the intended responder. The impostor then initiates an authentication with the responder. The impostor 1400 must present $C_{ImpostorInitiator}$ 1415 to the responder 1405 before receiving the randomized codeword (W) from the responder 1405. Thus, the impostor 1400 must choose $C_{ImpostorInitiator}$ 1415 with no knowledge of W. Once the impostor 1400 has received W from the responder 1405, the impostor 1400 can choose $C_{ImpostorResponder}$ 1420 based on W, which is a much easier task. To increase the impostor's odds of finding a digital certificate that generates the right digital fingerprint, the impostor 1400 should choose $C_{ImpostorInitiator}$ 1415 in advance so that it works for at least one value of W. If this is the case, then the impostor's odds of finding a matching digital certificate are 1/m. The 1400 impostor can increase the odds of success if the impostor can choose a $C_{ImpostorResponder}$ 1420 in advance that works for more than one value of W.

An impostor's ability to attack is limited by the amount of effort E that the impostor has to expend to generate a digital certificate+codeword combination that will work for at least the first impersonation. If a one-way hash of length 80 bits or greater is considered unbreakable, the impostor's task is infeasible as long as the imposter is required to compute $>=2^{80}$ hashes. An impostor's ability to attack is also limited by the probability O that the codeword chosen will actually be the one that initiator and responder are using. Note that implicit codeword comparison is part of the final out-of-band verification step in accordance with embodiments of the present invention. Thus, the maximum amount of choices for the randomized codeword (W) the impostor can test (k) is determined by the effort E.

For x=10, k=16 and m=256, the required effort (E) is $2^{85}$. In other words, assuming impostor expends the effort to find a $C_{ImpostorResponder}$ and a $C_{ImpostorInitiator}$ that works for 16 values of the codeword W, the impostor's probability of success (that responder and initiator will actually choose this codeword) is $$O = \frac{16}{256} = 0.0625$$

Thus, using even a ten-bit dynamic fingerprint and an eight-bit randomized codeword guarantees that an enormous effort on impostor's part can only assure the impostor of a 6.25% chance that he will actually succeed at the time of authentication, providing an excellent deterrent. For x=10, k=4 and m=256, $E=2^{21}$. The effort is reduced, but the odds of success are only 1.1%. For x=10, k=20 and m=256, $E=2^{110}$, and the odds of success are only increased to 7.8%.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for user authentication, comprising:
   sending a first digital certificate to a responder;
   receiving a randomized codeword in response to said sending;
   creating a secure fingerprint having a first size, said secure fingerprint based at least in part on said first digital certificate and said randomized codeword;
   creating a first bit sequence based at least in part on a first portion of said secure fingerprint and a second portion of said randomized codeword, said first bit sequence having a second size, said second size less than said first size, wherein said first bit sequence comprises bits of said first portion of said secure fingerprint interspersed among bits of said second portion of said randomized codeword; and
   indicating said first digital certificate is authenticated based upon whether said first bit sequence matches a second bit sequence received from said responder via an out-of-band communication in response to said sending.

2. The method of claim 1 wherein said indicating further comprises:
   indicating said first digital certificate is authenticated if said first bit sequence matches said second bit sequence; and
   indicating said first digital certificate is not authenticated if said first bit sequence does not match said second bit sequence.

3. The method of claim 1 wherein said creating a secure fingerprint further comprises applying a cryptographic one-way function to said first digital certificate and said randomized codeword.

4. The method of claim 3 wherein said cryptographic one-way function comprises the SHA-1 algorithm.

5. The method of claim 3 wherein said cryptographic one-way function comprises the MD5 algorithm.

6. The method of claim 1 wherein said indicating further comprises:
   using said first bit sequence as one or more indices into a vector of one or more representations;
   using said second bit sequence as one or more indices into said vector of one or more representations; and indicating said first digital certificate is authenticated based upon whether the one or more representations indexed by said first bit sequence match the one or more representations indexed by said second bit sequence.

7. A method for user authentication, comprising:
sending a first digital certificate to a responder;
receiving a randomized codeword in response to said sending, said randomized codeword comprising eight bits;
creating a secure fingerprint having a first size, said secure fingerprint based at least in part on said first digital certificate and said randomized codeword;
creating a first bit sequence based at least in part on a first portion of said secure fingerprint and a second portion of said randomized codeword, said first bit sequence having a second size, said second size less than said first size, said first bit sequence comprising said randomized codeword and the first ten bits of said secure fingerprint; and
indicating said first digital certificate is authenticated based upon whether said first bit sequence matches a second bit sequence received from said responder via an out-of-band communication in response to said sending, said indicating further comprising:
using said first bit sequence as one or more indices into a vector of one or more representations;
using said second bit sequence as one or more indices into said vector of one or more representations; and
indicating said first digital certificate is authenticated based upon whether the one or more representations indexed by said first bit sequence match the one or more representations indexed by said second bit sequence.

8. The method of claim 7 wherein said first bit sequence comprises two nine-bit indices.

9. The method of claim 7 wherein said first bit sequence comprises three four-bit indices.

10. The method of claim 7 wherein said first bit sequence comprises one sixteen-bit index.

11. The method of claim 6 wherein said one or more representations comprise one or more words.

12. The method of claim 6 wherein said one or more representations comprise one or more images.

13. The method of claim 6 wherein said one or more representations comprise one or more sounds.

14. The method of claim 6 wherein said one or more representations comprise one or more symbols.

15. A method for user authentication, comprising:
sending a first digital certificate to a responder;
receiving a randomized codeword in response to said sending;
creating a secure fingerprint having a first size, said secure fingerprint based at least in part on said first digital certificate and said randomized codeword;
creating a first bit sequence based at least in part on a first portion of said secure fingerprint and a second portion of said randomized codeword, said first bit sequence having a second size, said second size less than said first size; and
indicating said first digital certificate is authenticated based upon whether said first bit sequence matches a second bit sequence received from said responder via an out-of-band communication in response to said sending, said indicating further comprising:
using said first bit sequence as one or more indices into a vector of one or more representations;
using said second bit sequence as one or more indices into said vector of one or more representations; and
indicating said first digital certificate is authenticated based upon whether the one or more representations indexed by said first bit sequence match the one or more representations indexed by said second bit sequence;
wherein said first bit sequence comprises bits of said first portion of said secure fingerprint interspersed among bits of said second portion of said randomized codeword such that none of said one or more indices comprise the entire second portion of said randomized codeword.

16. The method of claim 1, further comprising receiving a second digital certificate in response to said sending.

17. The method of claim 1 wherein said creating a secure fingerprint further comprises applying a cryptographic one-way function to said at least part of said first digital certificate and said randomized codeword.

18. The method of claim 1 wherein said out-of-band communication comprises a telephone call.

19. The method of claim 1 wherein said out-of-band communication comprises an email message.

20. The method of claim 1 wherein said out-of-band communication comprises a facsimile.

21. The method of claim 1 wherein said out-of-band communication comprises a face-to-face communication.

22. A method for user authentication, comprising:
receiving a first digital certificate from an initiator;
sending a randomized codeword in response to said receiving;
creating a secure fingerprint having a first size, said secure fingerprint based at least in part on said first digital certificate and said randomized codeword;
creating a first bit sequence based at least in part on a first portion of said secure fingerprint and a second portion of said randomized codeword, said first bit sequence having a second size, said second size less than said first size, wherein said first bit sequence comprises bits of said first portion of said secure fingerprint interspersed among bits of said second portion of said randomized codeword; and
indicating said first digital certificate is authenticated based upon whether said first bit sequence matches a second bit sequence received from said initiator via an out-of-band communication in response to said sending.

23. A program storage device readable by a machine, embodying a program of instructions executable by the machine to perform a method for user authentication, the method comprising:
sending a first digital certificate to a responder;
receiving a randomized codeword in response to said sending;
creating a secure fingerprint having a first size, said secure fingerprint based at least in part on said first digital certificate and said randomized codeword;
creating a first bit sequence based at least in part on a first portion of said secure fingerprint and a second portion of said randomized codeword, said first bit sequence having a second size, said second size less than said first size, wherein said first bit sequence comprises bits of said first portion of said secure fingerprint interspersed among bits of said second portion of said randomized codeword; and
indicating said first digital certificate is authenticated based upon whether said first bit sequence matches a second bit sequence received from said responder via an out-of-band communication in response to said sending.

24. The program storage device of claim 23 wherein said indicating further comprises:
   indicating said first digital certificate is authenticated if said first bit sequence matches said second bit sequence; and
   indicating said first digital certificate is not authenticated if said first bit sequence does not match said second bit sequence.

25. The program storage device of claim 23 wherein said creating a secure fingerprint further comprises applying a cryptographic one-way function to said first digital certificate and said randomized codeword.

26. The program storage device of claim 25 wherein said cryptographic one-way function comprises the SHA-1 algorithm.

27. The program storage device of claim 25 wherein said cryptographic one-way function comprises the MD5 algorithm.

28. The program storage device of claim 23 wherein said indicating further comprises:
   using said first bit sequence as one or more indices into a vector of one or more representations;
   using said second bit sequence as one or more indices into said vector of one or more representations; and
   indicating said first digital certificate is authenticated based upon whether the one or more representations indexed by said first bit sequence match the one or more representations indexed by said second bit sequence.

29. A program storage device readable by a machine, embodying a program of instructions executable by the machine to perform a method for user authentication, the method comprising:
   sending a first digital certificate to a responder;
   receiving a randomized codeword in response to said sending, said randomized codeword comprising eight bits;
   creating a secure fingerprint having a first size, said secure fingerprint based at least in part on said first digital certificate and said randomized codeword;
   creating a first bit sequence based at least in part on a first portion of said secure fingerprint and a second portion of said randomized codeword, said first bit sequence having a second size, said second size less than said first size, said first bit sequence comprising said randomized codeword and the first ten bits of said secure fingerprint; and
   indicating said first digital certificate is authenticated based upon whether said first bit sequence matches a second bit sequence received from said responder via an out-of-band communication in response to said sending, said indicating further comprising:
      using said first bit sequence as one or more indices into a vector of one or more representations;
      using said second bit sequence as one or more indices into said vector of one or more representations; and
      indicating said first digital certificate is authenticated based upon whether the one or more representations indexed by said first bit sequence match the one or more representations indexed by said second bit sequence.

30. The program storage device of claim 29 wherein said first bit sequence comprises two nine-bit indices.

31. The program storage device of claim 29 wherein said first bit sequence comprises three four-bit indices.

32. The program storage device of claim 29 wherein said first bit sequence comprises one sixteen-bit index.

33. The program storage device of claim 28 wherein said one or more representations comprise one or more words.

34. The program storage device of claim 28 wherein said one or more representations comprise one or more images.

35. The program storage device of claim 28 wherein said one or more representations comprise one or more sounds.

36. The program storage device of claim 28 wherein said one or more representations comprise one or more symbols.

37. A program storage device readable by a machine, embodying a program of instructions executable by the machine to perform a method for user authentication, the method comprising:
   sending a first digital certificate to a responder;
   receiving a randomized codeword in response to said sending;
   creating a secure fingerprint having a first size, said secure fingerprint based at least in part on said first digital certificate and said randomized codeword;
   creating a first bit sequence based at least in part on a first portion of said secure fingerprint and a second portion of said randomized codeword, said first bit sequence having a second size, said second size less than said first size
   indicating said first digital certificate is authenticated based upon whether said first bit sequence matches a second bit sequence received from said responder via an out-of-band communication in response to said sending, said indicating further comprising:
      using said first bit sequence as one or more indices into a vector of one or more representations;
      using said second bit sequence as one or more indices into said vector of one or more representations; and
      indicating said first digital certificate is authenticated based upon whether the one or more representations indexed by said first bit sequence match the one or more representations indexed by said second bit sequence;
   wherein said first bit sequence comprises bits of said first portion of said secure fingerprint interspersed among bits of said second portion of said randomized codeword such that none of said one or more indices comprise the entire second portion of said randomized codeword.

38. The program storage device of claim 23, further comprising receiving a second digital certificate in response to said sending.

39. The program storage device of claim 23 wherein said creating a secure fingerprint further comprises applying a cryptographic one-way function to said at least part of said first digital certificate and said randomized codeword.

40. The program storage device of claim 23 wherein said out-of-band communication comprises a telephone call.

41. The program storage device of claim 23 wherein said out-of-band communication comprises an email message.

42. The program storage device of claim 23 wherein said out-of-band communication comprises a facsimile.

43. The program storage device of claim 23 wherein said out-of-band communication comprises a face-to-face communication.

44. A program storage device readable by a machine, embodying a program of instructions executable by the machine to perform a method for user authentication, the method comprising:

receiving a first digital certificate from an initiator;
sending a randomized codeword in response to said receiving;
creating a secure fingerprint having a first size, said secure fingerprint based at least in part on said first digital certificate and said randomized codeword;
creating a first bit sequence based at least in part on a first portion of said secure fingerprint and a second portion of said randomized codeword, said first bit sequence having a second size, said second size less than said first size, wherein said first bit sequence comprises bits of said first portion of said secure fingerprint interspersed among bits of said second portion of said randomized codeword; and
indicating said first digital certificate is authenticated based upon whether said first bit sequence matches a second bit sequence received from said initiator via an out-of-band communication in response to said sending.

45. An apparatus for user authentication, comprising:
means for sending a first digital certificate to a responder;
means for receiving a randomized codeword in response to said sending;
means for creating a secure fingerprint having a first size, said secure fingerprint based at least in part on said first digital certificate and said randomized codeword;
means for creating a first bit sequence based at least in part on a first portion of said secure fingerprint and a second portion of said randomized codeword, said first bit sequence having a second size, said second size less than said first size, wherein said first bit sequence comprises bits of said first portion of said secure fingerprint interspersed among bits of said second portion of said randomized codeword; and
means for indicating said first digital certificate is authenticated based upon whether said first bit sequence matches a second bit sequence received from said responder via an out-of-band communication in response to said sending.

46. The apparatus of claim 45 wherein said means for indicating further comprises:
means for indicating said first digital certificate is authenticated if said first bit sequence matches said second bit sequence; and
means for indicating said first digital certificate is not authenticated if said first bit sequence does not match said second bit sequence.

47. The apparatus of claim 45 wherein said means for creating a secure fingerprint further comprises means for applying a cryptographic one-way function to said first digital certificate and said randomized codeword.

48. The apparatus of claim 47 wherein said cryptographic one-way function comprises the SHA-1 algorithm.

49. The apparatus of claim 47 wherein said cryptographic one-way function comprises the MD5 algorithm.

50. The apparatus of claim 45 wherein said means for indicating further comprises:
means for using said first bit sequence as one or more indices into a vector of one or more representations;
means for using said second bit sequence as one or more indices into said vector of one or more representations; and
means for indicating said first digital certificate is authenticated based upon whether the one or more representations indexed by said first bit sequence match the one or more representations indexed by said second bit sequence.

51. An apparatus for user authentication, comprising:
means for sending a first digital certificate to a responder;
means for receiving a randomized codeword in response to said sending, said randomized codeword comprising eight bits;
means for creating a secure fingerprint having a first size, said secure fingerprint based at least in part on said first digital certificate and said randomized codeword;
means for creating a first bit sequence based at least in part on a first portion of said secure fingerprint and a second portion of said randomized codeword, said first bit sequence having a second size, said second size less than said first size, said first bit sequence comprising said randomized codeword and the first ten bits of said secure fingerprint; and
means for indicating said first digital certificate is authenticated based upon whether said first bit sequence matches a second bit sequence received from said responder via an out-of-band communication in response to said sending, said means for indicating further comprising:
means for using said first bit sequence as one or more indices into a vector of one or more representations;
means for using said second bit sequence as one or more indices into said vector of one or more representations; and
means for indicating said first digital certificate is authenticated based upon whether the one or more representations indexed by said first bit sequence match the one or more representations indexed by said second bit sequence.

52. The apparatus of claim 51 wherein said first bit sequence comprises two nine-bit indices.

53. The apparatus of claim 51 wherein said first bit sequence comprises three four-bit indices.

54. The apparatus of claim 51 wherein said first bit sequence comprises one sixteen-bit index.

55. The apparatus of claim 50 wherein said one or more representations comprise one or more words.

56. The apparatus of claim 50 wherein said one or more representations comprise one or more images.

57. The apparatus of claim 50 wherein said one or more representations comprise one or more sounds.

58. The apparatus of claim 50 wherein said one or more representations comprise one or more symbols.

59. An apparatus for user authentication, comprising:
means for sending a first digital certificate to a responder;
means for receiving a randomized codeword in response to said sending;
means for creating a secure fingerprint having a first size, said secure fingerprint based at least in part on said first digital certificate and said randomized codeword;
means for creating a first bit sequence based at least in part on a first portion of said secure fingerprint and a second portion of said randomized codeword, said first bit sequence having a second size, said second size less than said first size; and
means for indicating said first digital certificate is authenticated based upon whether said first bit sequence matches a second bit sequence received from said responder via an out-of-band communication in response to said sending, said means for indicating further comprising:
means for using said first bit sequence as one or more indices into a vector of one or more representations;

means for using said second bit sequence as one or more indices into said vector of one or more representations; and means for indicating said first digital certificate is authenticated based upon whether the one or more representations indexed by said first bit sequence match the one or more representations indexed by said second bit sequence;

said first bit sequence comprising bits of said first portion of said secure fingerprint interspersed among bits of said second portion of said randomized codeword such that none of said one or more indices comprise said entire second portion of the randomized codeword.

60. The apparatus of claim 45, further comprising means for receiving a second digital certificate in response to said sending.

61. The apparatus of claim 45 wherein said means for creating a secure fingerprint further comprises means for applying a cryptographic one-way function to said at least part of said first digital certificate and said randomized codeword.

62. The apparatus of claim 45 wherein said out-of-band communication comprises a telephone call.

63. The apparatus of claim 45 wherein said out-of-band communication comprises an email message.

64. The apparatus of claim 45 wherein said out-of-band communication comprises a facsimile.

65. The apparatus of claim 45 wherein said out-of-band communication comprises a face-to-face communication.

66. An apparatus for user authentication, comprising:
means for receiving a first digital certificate from an initiator;
means for sending a randomized codeword in response to said receiving;
means for creating a secure fingerprint having a first size, said secure fingerprint based at least in part on said first digital certificate and said randomized codeword;
means for creating a first bit sequence based at least in part on a first portion of said secure fingerprint and a second portion of said randomized codeword, said first bit sequence having a second size, said second size less than said first size, wherein said first bit sequence comprises bits of said first portion of said secure fingerprint interspersed among bits of said second portion of said randomized codeword; and
means for indicating said first digital certificate is authenticated based upon whether said first bit sequence matches a second bit sequence received from said initiator via an out-of-band communication in response to said sending.

67. An apparatus for user authentication, comprising:
a memory for storing at least one randomized codeword; and
a processor configured to:
send a first digital certificate to a responder;
receive a randomized codeword in response to said first digital certificate being sent to said responder;
create a secure fingerprint having a first size, said secure fingerprint based at least in part on said first digital certificate and said randomized codeword;
create a first bit sequence based at least in part on a first portion of said secure fingerprint and a second portion of said randomized codeword, said first bit sequence having a second size, said second size less than said first size, wherein said first bit sequence comprises bits of said first portion of said secure fingerprint interspersed among bits of said second portion of said randomized codeword; and
indicate said first digital certificate is authenticated based upon whether said first bit sequence matches a second bit sequence received from said responder via an out-of-band communication in response to said first digital certificate being sent to said responder.

68. The apparatus of claim 67 wherein said processor is further configured to:
indicate said first digital certificate is authenticated if said first bit sequence matches said second bit sequence; and
indicate said first digital certificate is not authenticated if said first bit sequence does not match said second bit sequence.

69. The apparatus of claim 67 wherein said processor is further configured to create said secure fingerprint by applying a cryptographic one-way function to said first digital certificate and said randomized codeword.

70. The apparatus of claim 69 wherein said cryptographic one-way function comprises the SHA-1 algorithm.

71. The apparatus of claim 69 wherein said cryptographic one-way function comprises the MD5 algorithm.

72. The apparatus of claim 67 wherein said processor is further configured to:
use said first bit sequence as one or more indices into a vector of one or more representations;
use said second bit sequence as one or more indices into said vector of one or more representations; and
indicate said first digital certificate is authenticated based upon whether the one or more representations indexed by said first bit sequence match the one or more representations indexed by said second bit sequence.

73. An apparatus for user authentication, comprising:
a memory for storing at least one randomized codeword; and
a processor configured to:
send a first digital certificate to a responder;
receive a randomized codeword in response to said first digital certificate being sent to said responder, said randomized codeword comprising eight bits;
create a secure fingerprint having a first size, said secure fingerprint based at least in part on said first digital certificate and said randomized codeword;
create a first bit sequence based at least in part on a first portion of said secure fingerprint and a second portion of said randomized codeword, said first bit sequence having a second size, said second size less than said first size, said first bit sequence comprising said randomized codeword and the first ten bits of said secure fingerprint; and
indicate said first digital certificate is authenticated based upon whether said first bit sequence matches a second bit sequence received from said responder via an out-of-band communication in response to said first digital certificate being sent to said responder, wherein said processor further configured to:
use said first bit sequence as one or more indices into a vector of one or more representations;
use said second bit sequence as one or more indices into said vector of one or more representations; and
indicate said first digital certificate is authenticated based upon whether the one or more representations indexed by said first bit sequence match the one or more representations indexed by said second bit sequence.

74. The apparatus of claim 73 wherein said first bit sequence comprises two nine-bit indices.

75. The apparatus of claim 73 wherein said first bit sequence comprises three four-bit indices.

76. The apparatus of claim 73 wherein said first bit sequence comprises one sixteen-bit index.

77. The apparatus of claim 72 wherein said one or more representations comprise one or more words.

78. The apparatus of claim 72 wherein said one or more representations comprise one or more images.

79. The apparatus of claim 72 wherein said one or more representations comprise one or more sounds.

80. The apparatus of claim 72 wherein said one or more representations comprise one or more symbols.

81. An apparatus for user authentication, comprising:
a memory for storing at least one randomized codeword; and
a processor configured to:
send a first digital certificate to a responder;
receive a randomized codeword in response to said first digital certificate being sent to said responder;
create a secure fingerprint having a first size, said secure fingerprint based at least in part on said first digital certificate and said randomized codeword;
create a first bit sequence based at least in part on a first portion of said secure fingerprint and a second portion of said randomized codeword, said first bit sequence having a second size, said second size less than said first size; and
indicate said first digital certificate is authenticated based upon whether said first bit sequence matches a second bit sequence received from said responder via an out-of-band communication in response to said first digital certificate being sent to said responder, wherein said processor is further configured to:
use said first bit sequence as one or more indices into a vector of one or more representations;
use said second bit sequence as one or more indices into said vector of one or more representations; and
indicate said first digital certificate is authenticated based upon whether the one or more representations indexed by said first bit sequence match the one or more representations indexed by said second bit sequence;
wherein said first bit sequence comprises bits of said first portion of said secure fingerprint interspersed among bits of said second portion of said randomized codeword such that none of said one or more indices comprise the entire second portion of said randomized codeword.

82. The apparatus of claim 67 wherein said processor is further configured to receive a second digital certificate in response to said sending.

83. The apparatus of claim 67 wherein said creating a secure fingerprint further comprises applying a cryptographic one-way function to said at least part of said first digital certificate and said randomized codeword.

84. The apparatus of claim 67 wherein said out-of-band communication comprises a telephone call.

85. The apparatus of claim 67 wherein said out-of-band communication comprises an email message.

86. The apparatus of claim 67 wherein said out-of-band communication comprises a facsimile.

87. The apparatus of claim 67 wherein said out-of-band communication comprises a face-to-face communication.

88. An apparatus for user authentication, comprising:
a memory for storing a randomized codeword; and
a processor configured to:
receive a first digital certificate from an initiator;
send said randomized codeword in response to said receiving;
create a secure fingerprint having a first size, said secure fingerprint based at least in part on said first digital certificate and said randomized codeword;
create a first bit sequence based at least in part on a first portion of said secure fingerprint and a second portion of said randomized codeword, said first bit sequence having a second size, said second size less than said first size, wherein said first bit sequence comprises bits of said first portion of said secure fingerprint interspersed among bits of said second portion of said randomized codeword; and
indicate said first digital certificate is authenticated based upon whether said first bit sequence matches a second bit sequence received from said initiator via an out-of-band communication in response to said sending.

* * * * *